United States Patent [19]

Ott et al.

[11] 4,046,031
[45] Sept. 6, 1977

[54] PLANETARY-GEAR TRANSMISSION

[75] Inventors: Anton Ott, Tettnang; Friedrich Ehrlinger, Friedrichshafen; Dietrich Knödler, Friedrichshafen; Roland Zdansevicius, Friedrichshafen, all of Germany

[73] Assignee: Zahnradfabrik Friedrichshafen AG, Friedrichshafen, Germany

[21] Appl. No.: 620,139

[22] Filed: Oct. 6, 1975

[30] Foreign Application Priority Data

Oct. 5, 1974  Germany .............................. 2447581

[51] Int. Cl.$^2$ ............................................ F16H 57/10
[52] U.S. Cl. ..................................................... 74/764
[58] Field of Search .......................................... 74/764

[56] References Cited
U.S. PATENT DOCUMENTS

| | | | |
|---|---|---|---|
| 3,410,157 | 11/1968 | Livezey | 74/764 |
| 3,946,622 | 3/1976 | Murakami et al. | 74/764 |
| 3,946,623 | 3/1976 | Murakami et al. | 74/764 |

*Primary Examiner*—Samuel Scott
*Assistant Examiner*—Wesley S. Ratliff, Jr.
*Attorney, Agent, or Firm*—Karl F. Ross

[57] ABSTRACT

An automotive transmission comprises a plurality of cascaded planetary-gear stages consisting each of a sun gear, a planet carrier and a ring gear. The stages, or some of them, constitute modular units which may be added or eliminated to vary the number of available speed ratios. With four stages and eight selectively operable coupling elements, i.e., four clutches and four brakes, eight forward speeds and six reverse speeds may be realized. The sun gears of three stages are fixed to a common intermediary shaft, connectable to an input shaft by one of the clutches, while the corresponding ring gears are individually immobilizable by respective brakes. Two of the three components of the fourth stage, namely the carrier and the ring gear, are cross-connected with the ring gear and the carrier of the third stage and, like the sun gear of this fourth stage, may be individually linked with the input shaft via other intermediate shafts and associated clutches. The planet carrier of the first stage is fixed to an output shaft while the carrier of the third stage is rigid with the ring gear of the second stage; the carrier of the second stage is fixedly connected with either the ring gear or the carrier of the first stage.

15 Claims, 26 Drawing Figures

| PLANETARY STAGE | SUN GEAR | | RING GEAR | |
| --- | --- | --- | --- | --- |
| | REF. | NO. OF TEETH | REF. | NO. OF TEETH |
| I | 11 | 22 | 13 | 90 |
| II | 21 | 45 | 23 | 90 |
| III | 31 | 40 | 33 | 90 |
| IV | 41 | 35 | 43 | 85 |

| SPEED | COUPLING ELEMENTS OPERATED | TRANSMISSION RATIO | |
|---|---|---|---|
| 1 | A,H | 5,09 | STEP-DOWN |
| 2 | A,G | 2,15 | |
| 3 | A,F | 1,59 | |
| 4 | A,E | 1,27 | |
| 5 | A,B | 1,00 | |
| 6 | B,E | 0,77 | STEP-UP |
| 7 | C,E | 0,54 | |
| 8 | B,F | 0,49 | |
| 1 R | D,H | -14,18 | STEP-DOWN |
| 2 R | C,H | -5,94 | |
| 3 R | D,G | -3,28 | |
| 4 R | B,H | -2,54 | |
| 5 R | D,F | -1,19 | |
| 6 R | C,G | -0,96 | STEP-UP |

FIG. 5

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,E | |
| 5 | A,B | DIRECT (1:1) |
| 6 | B,E | STEP-UP |
| 7 | C,E | |
| 8 | B,F | |
| 1R | D,H | REVERSE |
| 2R | D,G | |
| 3R | C,H | |
| 4R | D,F | |
| 5R | C,G | |
| 6R | B,H | |

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,E | |
| 5 | A,B | DIRECT |
| 6 | B,E | STEP-UP |
| 7 | B,F | |
| 1 R | D,G | REVERSE |
| 2 R | D,F | |

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,E | |
| 5 | A,B | DIRECT |
| 6 | B,E | STEP-UP |
| 1 R | D,G | REVERSE |
| 2 R | D,F | |

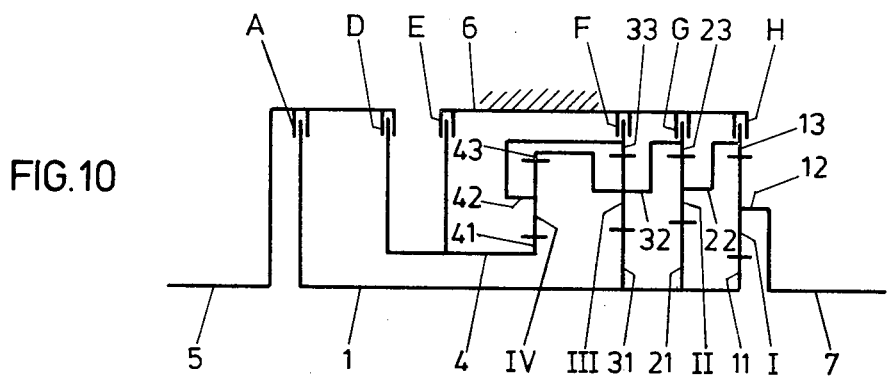
FIG.10
FIG.11
| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,E | |
| 5 | A,D | DIRECT |
| 1 R | D,G | REVERSE |
| 2 R | D,F | |
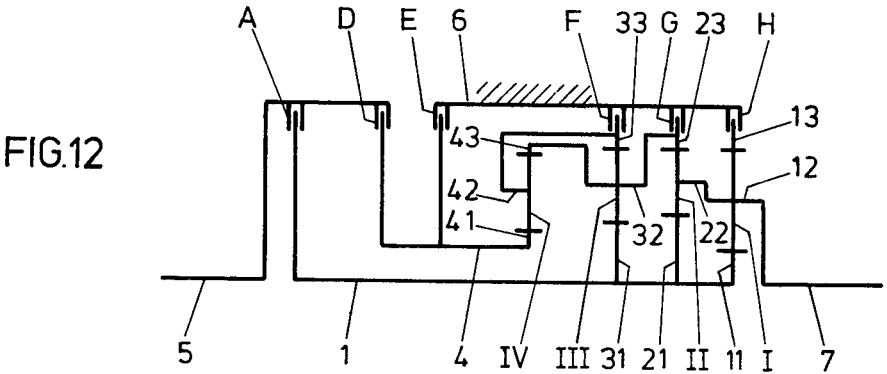
FIG.12

| SPEED | COUPLING ELEMENTS OPERATED | TRANSMISSION RATIO |
|---|---|---|
| 1 | A,G | STEP-DOWN |
| 2 | A,F | |
| 3 | A,E | |
| 4 | A,B | DIRECT |
| 5 | B,E | STEP-UP |
| 6 | B,F | |
| 1 R | D,G | REVERSE |
| 2 R | D,F | |

| SPEED | COUPLING ELEMENTS OPERATED | TRANSMISSION RATIO |
|---|---|---|
| 1 | A,G | STEP-DOWN |
| 2 | A,F | |
| 3 | A,E | |
| 4 | A,D | DIRECT |
| 1 R | D,G | REVERSE |
| 2 R | D,F | |

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,B | DIRECT |
| 5 | B,F | STEP-UP |
| 1 R | C,H | REVERSE |
| 2 R | B,H | |
| 3 R | C,G | |

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,C | DIRECT |
| 1 R | C,H | REVERSE |
| 2 R | C,G | |

| SPEED | COUPLING ELEMENTS OPERATED | TRANSMISSION RATIO |
|---|---|---|
| 1 | A, G | STEP-DOWN |
| 2 | A, F | STEP-DOWN |
| 3 | A, B | DIRECT |
| 4 | B, F | STEP-UP |
| R | C, G | REVERSE |

| SPEED | COUPLING ELEMENTS OPERATED | TRANSMISSION RATIO |
|---|---|---|
| 1 | A,G | STEP-DOWN |
| 2 | A,F | STEP-DOWN |
| 3 | A,C | DIRECT |
| R | C,G | REVERSE |

| SPEED | COUPLING ELEMENTS OPERATED | TRANSMISSION RATIO |
|---|---|---|
| 1 | A,H | STEP-DOWN |
| 2 | A,G | |
| 3 | A,F | |
| 4 | A,B | DIRECT |
| 5 | B,F | STEP-UP |
| R | B,H | REVERSE |

PLANETARY-GEAR TRANSMISSION

FIELD OF THE INVENTION

Our present invention relates to a planetary-gear transmission, especially (but not exclusively) for automotive vehicles, designed to provide a plurality of speed ratios between an input shaft and an output shaft.

BACKGROUND OF THE INVENTION

The usual planetary-gear train with three coaxial components, i.e., a sun gear, a surrounding ring gear and a planet carrier having one or more pinions in mesh with both gears, is widely used for automatic gear shifting. In such a gear train one of the components acts as a driving element, another is a driven element and the remaining one serves as a control element providing a reaction force upon being immobilized, thereby reducing the originally existing two degrees of freedom of the gear train to a single degree. Coupling elements for operatively connecting the driving component with an input shaft and/or the driven component with an output shaft as well as for immobilizing the control component comprise clutches and brakes, usually of the hydraulic type. With suitable combinations of a pair of such three-component gear trains, together with the associated clutches and brakes, it is possible to establish three forward speed ratios and one reverse speed ratio as is common in conventinal automotive transmissions. Selection of any of these speeds requires the simultaneous actuation of two coupling elements, generally a clutch and a brake except in the case of direct drive (transmission ratio 1:1) for which two clutches are concurrently operated.

In order to increase the number of available speed ratios beyond the four referred to above, more than two planetary-gear trains may be connected in cascade as described, for example, in commonly owned U.S. Pat. No. 3,820,418. These prior transmissions are satisfactory for their intended purpose but are only limitedly adaptable to different operating conditions calling for either an increase or a decrease in the number of available speed ratios.

OBJECTS OF THE INVENTION

Thus, it is an important object of our present invention to provide an improved and more versatile transmission of the aforedescribed type, including two or more cascaded planetary-gear stages of three components each, which can be easily modified to satisfy different requirements.

A more particular object is to provide a comprehensive multistage transmission of this character in which the several planetary-gear stages, or at least some of them, can be designed as demountable modular units whose selective removal from the basic transmission leaves a variety of fully operative subassemblies with different combinations of speed ratios.

Another object is to provide a comprehensive transmission, as defined above, affording a large number of speed ratios (referred to hereinafter, for convenience, as "speeds") which are well distributed for both the positive, i.e., forward, and the negative, i.e., reverse, speed range and wherein a change between adjoining speeds can be effected, at least in the majority of forward positions, by a switchover from only one coupling element to another, a companion coupling element remaining actuated at both speeds.

SUMMARY OF THE INVENTION

In accordance with our present invention, a plurality of planetary-gear stages of the three-component type as defined above include at least two stages, i.e., an upstream stage and a downstream stage, having their driving components rigid with one of several coaxial intermediate shafts, these intermediate shafts being selectively connectable with an input shaft by the actuation of respective clutches. The control components of the two stages are selectively immobilizable by respective brakes, the driver component of the upstream stage being fixedly connected with the control component of the downstream stage whose driven component is operatively linked with an output shaft. Another intermediate shaft is operatively linked with the control component of the upstream stage and can therefore also be selectively immobilized. The term "operatively linked," as herein used, encompasses both a direct connection and a connection by way of one or more additional planetary-gear stages.

The above-described two-stage transmission constitutes a basic assembly yielding three forward speeds and one reverse speed, its principal advantage in comparison with conventional two-stage planetary-gear transmissions being the ease with which this basic assembly can be expanded by the addition of one or more modular units of the same three-component construction to provide additional speeds. Thus, a further stage may be inserted between the downstream stage and the output shaft, that further stage having its driving component rigid with the firstmentioned intermediate shaft and therefore also with the corresponding components of the other two stages. Alternatively, or in conjunction therewith, an additional stage can be inserted between the control component of the upstream stage and or intermediate shaft which is rigid with the driving component of that additional stage, the driven and control components of the additional stage being crossconnected with the control and driven components of the upstream stage.

In the preferred embodiments described hereinafter, the driving components are the sun gears, the driven components are the planet carriers and the control components are the ring gears of the several cascaded planetary-gear trains.

BRIEF DESCRIPTION OF THE DRAWING

The above and other features of our invention will now be described in detail with reference to the accompanying drawing in which:

FIG. 5 is a table similar to that of FIG. 3 but relating to the embodiment of FIG. 4;

FIGS. 6, 10, 13, 15, 17, 19, 21, 23 and 25 are diagrammatic illustrations of simplified versions of the transmission shown in FIG. 1;

FIGS. 8 and 12 are views similar to FIGS. 6 and 10 but relating to simplifications of the transmission shown in FIG. 4; and FIGS. 7, 9, 11, 14, 16, 18, 20, 22, 24 and 26 are tables respectively relating to the operation of the systems of FIGS. 6, 8, 10/12, 13, 15, 17, 19, 21, 23 and 25.

SPECIFIC DESCRIPTION

Figures 1, 2:
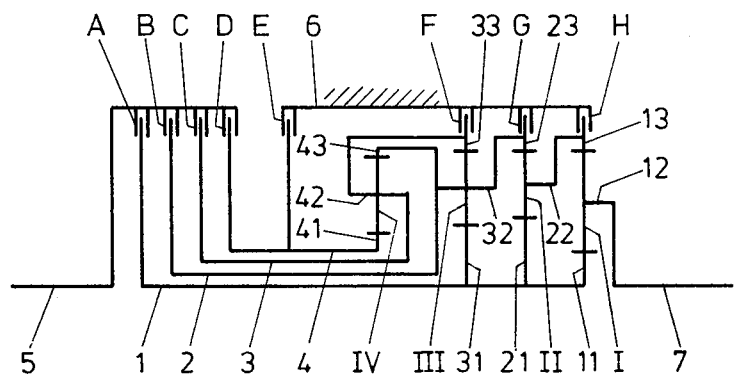
FIG. 1 is a diagrammatic view of a comprehensive transmission embodying our invention.
FIGS. 2 and 3 are tables relating to the operation of the system of FIG. 1.

In FIG. 1 we have shown a comprehensive transmission according to our invention with four cascaded planetary-gear stages I, II, III and IV, and input shaft 5, an output shaft 7, four coaxially nested intermediate shafts 1, 2, 3 and 4, four clutches A, B, C and D selectively actuatable to connect any of these intermediate shafts with the input shaft 5, and four brakes E, F, G and H for respectively immobilizing the control components of stages IV, III, II and I with reference to a transmission housing 6. Each stage has a driving component, i.e. a sun gear designated 11, 21, 31 and 41 for stages I, II, III and IV, as well as a driven component, namely a planet carrier designated 12, 22, 32 and 42 for the respective stages; the control components of stages I-III engageable by brakes H, G, and F are ring gears respectively designated 13, 23, and 33. Brake E acts upon the shaft 4 which is rigid with sun gear 41 of stage IV whose control component is a ring gear 43 rigid with shaft 2 and with planet carrier 32. Shaft 1 is rigid with sun gears 11, 21, 31 whereas shaft 3 is rigid with planet carrier 42 and ring gear 33, being thus immobilizable by brake F.

Figures 3, 4:
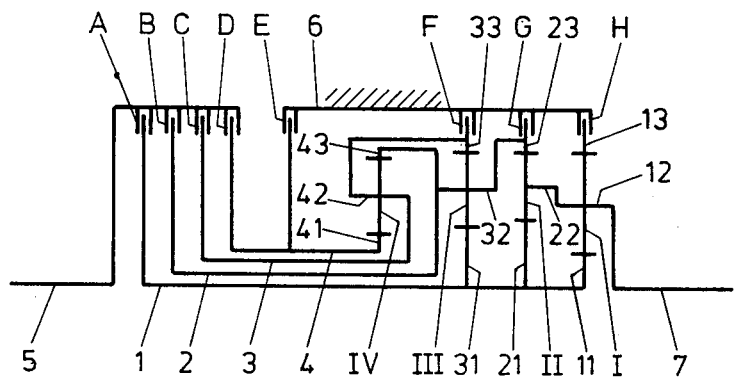
FIG. 4 is a diagrammatic view similar to FIG. 1, illustrating a modification.

The Table of FIG. 2 gives respective values for the number of teeth of sun gears 11, 21, 31, 41 and ring gears 13, 23, 33 and 43 in the system of FIG. 1 which yields eight forward speeds and six reverse speeds as listed in the Table of FIG. 3. The latter Table also shows the resulting transmission ratios, based on the tooth ratios of FIG. 2, indicating four step-down positions, one direct-drive position and three step-up positions in forward gear and five step-down positions as well as one step-up position in reverse gear.

The system of FIG. 4 differs from that of FIG. 1 only in that the planet carrier 22 of stage II is rigid with the carrier 12 of stage I, and therefore also with output shaft 7, rather than with its ring gear 13. With this modification the number of available forward and reverse speeds as well as the distribution of the forward speeds among step-down, direct-drive and step-up positions remains the same, as indicated in the Table of FIG. 5.

From FIGS. 3 and 5 it will also be noted that, except for the 8th forward speed, the various positions in forward gear follow one another in such a way that a change from one position to the next requires only the deactivation of one of the two simultaneously operated coupling elements and actuation of one other coupling element in its stead.

Figures 6, 7:
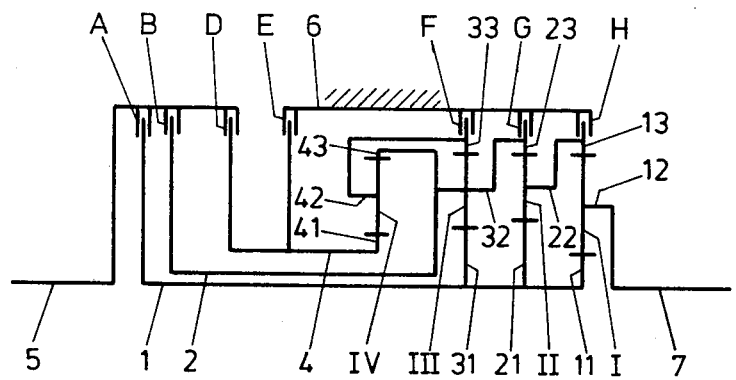

FIG. 6 shows a simplified version of the transmission of FIG. 1 in which clutch C and intermediate shaft 3 have been omitted. This eliminates one of the forward speeds and four of the reverse speeds, creating an arrangement in which a changeover between any two adjoining speeds (either forward or reverse) is carried out with continuing actuation of one of the two jointly operated coupling elements.

Figures 8, 9:
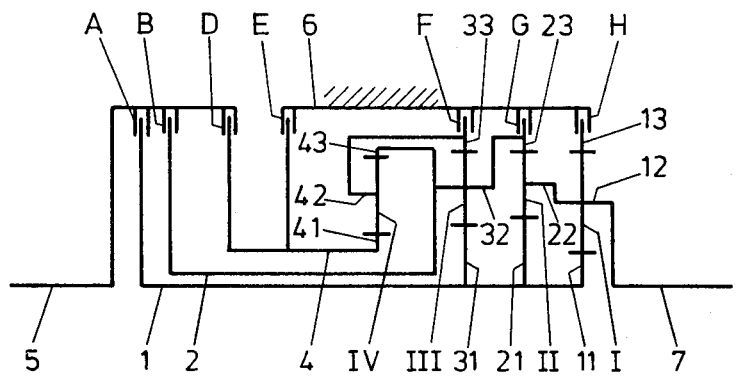

A similar situation exists, as indicated in the Table of FIG. 9, with the simplified system of FIG. 8 wherein clutch C and shaft 3 have been omitted in a transmission otherwise corresponding to that of FIG. 4. Six forward speeds and two reverse speeds are available in this instance.

The systems of FIGS. 10 and 12 are derived from those of FIGS. 1 and 4, respectively, by the omission of clutches B, C and shafts 2, 3. The corresponding Table, FIG. 11, shows five forward speeds and two reverse speeds.

Figures 13, 14:
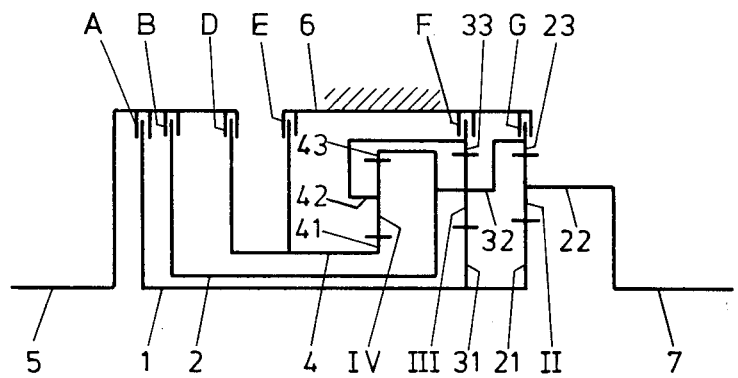

The simplified transmission of FIG. 13 differs from that of FIG. 8 by the elimination of stage I, planet carrier 22 being here directly connected with output shaft 7. The Table of FIG. 14 indicates again the existence of six forward speeds and two reverse speeds for this arrangement.

Figures 15, 16:
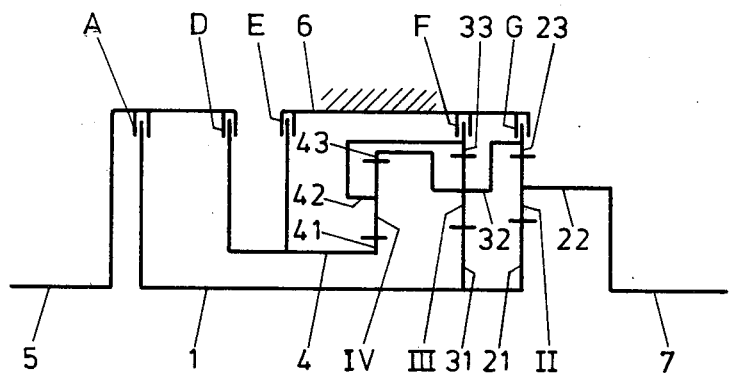
Figures 17, 18:
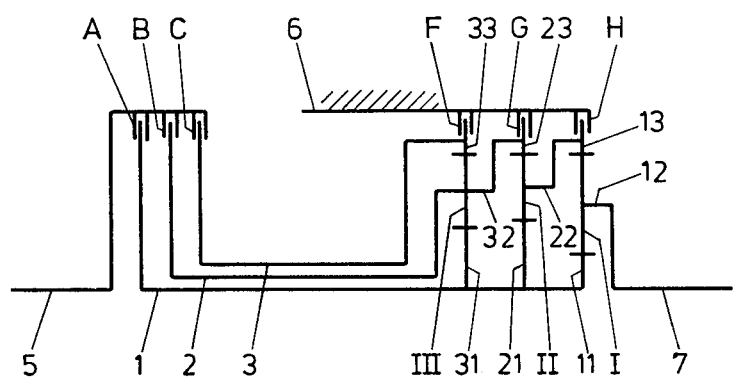

FIG. 15 shows a transmission derived from that of FIG. 12 by the elimination of stage I. Four forward and two reverse speeds are listed in the corresponding Table of FIG. 16. FIG. 17 illustrates a system differing from that of FIG. 1 by the absence of shaft 4, clutch D, brake E and stage IV. FIG. 18 shows five forward and three reverse speeds for this arrangement.

Figures 19, 20:
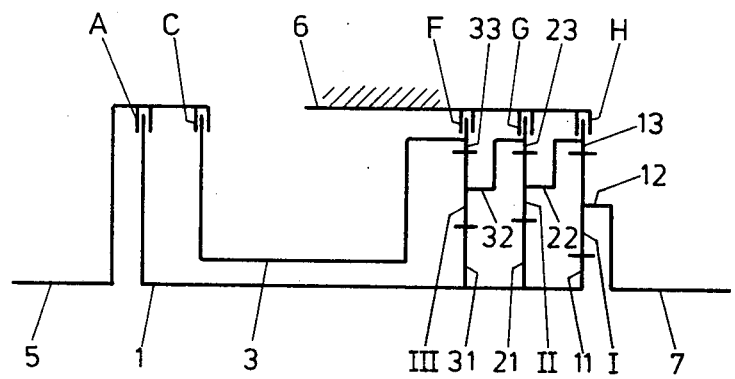

The system of FIG. 19 differs from that of FIG. 17 by the further omission of clutch B and shaft 2. With this simplification another forward speed and another reverse speed are sacrificed, as indicated in FIG. 20.

Figures 21, 22:
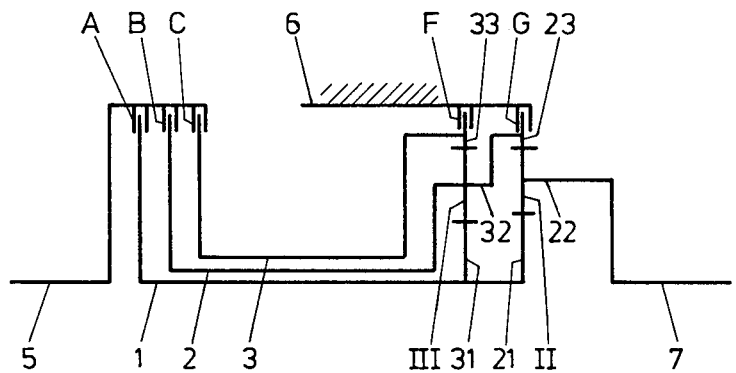

FIG. 21 represents another simplification of the system of FIG. 17 with omission of stage I. This transmission provides four forward speeds and one reverse speed according to FIG. 22.

Figures 23, 24:
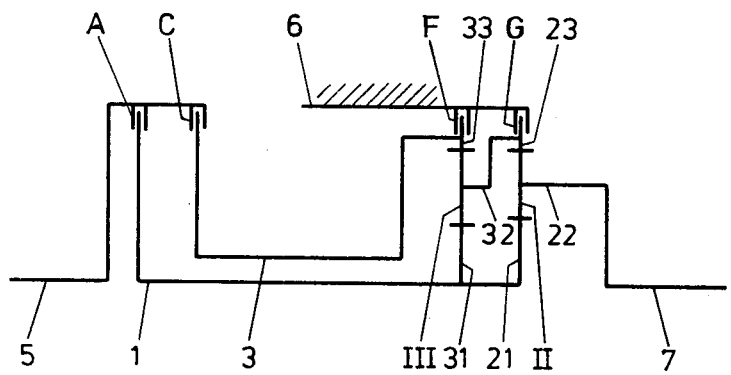

FIG. 23 depicts the ultimate simplification with elimination of clutch B and shaft 2 from the system of FIG. 21. The resulting basic assembly has the conventional three forward speeds and one reverse speed, as shown in FIG. 24.

Figures 25, 26:
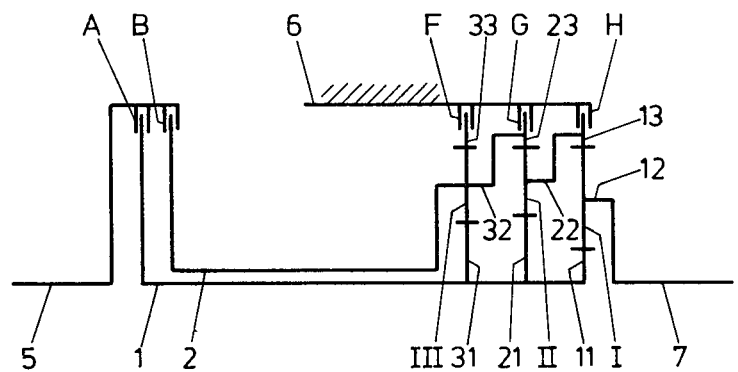

In FIG. 25, finally, the three-stage transmission of FIG. 17 has been simplified by omission of clutch C and shaft 3. The results are the loss of two reverse speeds, leaving five forward speeds and one reverse speed as per FIG. 26.

It should be noted that in some instances the input and output shafts 5 and 7 may be interchanged, with shaft 7 connected to a prime mover such as a vehicular engine and shaft 5 connected to a load such as the traction wheels of the vehicle instead of the other way around as assumed hereinabove.

With the numerical example given in FIG. 2, the various transmission ratios listed in FIG. 3 are closely and more or less uniformly spaced, especially for the higher speeds. If the tooth ratios are modified, the numerical order of some of these ratios may change so that the sequence of clutch and brake actuatuons would have to be altered.

Where a lesser number of speeds is sufficient, the simplifications described with reference to FIGS. 6 – 26 reduce the relative velocities of interacting components and eliminate some waste motion. The large number of originally available speeds, especially in reverse gear where such a great choice is rarely needed, affords a wide selection of tooth ratios for the limited number of speeds ultimately chosen.

The alternate engagement of two coupling elements (i.e., a clutch and a brake) with certain components, specifically those of stage IV, limits the number of stages required for a given number of speeds. This advantage is absent in conventional transmission systems with kinematically independent modular units.

We claim:

1. A transmission providing a plurality of speed ratios between an input shaft and an output shaft, comprising:
    a plurality of planetary-gear stages including a downstream stage, an upstream stage and an additional stage, ahead of said upstream stage, each of said stages consisting of a sun gear, a ring gear and a planet carrier having at least one pinion in mesh with said sun and ring gears, said downstream stage having its ring gear operatively linked with said output shaft, said additional stage having its planet carrier fixedly connected with the ring gear of said upstream stage and further having its ring gear fixedly connected with the planet carrier of said upstream stage and with the ring gear of said downstream stage;

a plurality of coaxial intermediate shafts, one of said intermediate shafts being rigid with the sun gears of said upstream and downstream stages, another of said intermediate shafts being rigid with the sun gear of said additional stage;

a plurality of clutches selectively actuatable to connect any of said intermediate shafts with said input shaft; and a plurality of brakes selectively actuatable to immobilize the sun gear of said additional stage and the ring gears of said upstream and downstream stages whereby a plurality of forward and reverse speed ratios are establishable by the joint actuation of a selected clutch and a selected brake.

2. A transmission as defined in claim 1 wherein the ring gear of said additional stage is rigid with a further one of said intermediate shafts.

3. A transmission as defined in claim 1 wherein the planet carrier of said additional stage is rigid with a further one of said intermediate shafts.

4. A transmission as defined in claim 1 wherein said additional stage and the brake for immobilizing the sun gear thereof are demountable and said other of said intermediate shafts is directly connectable with the ring gear of said upstream stage, with resulting reduction in the number of said speed ratios.

5. A transmission providing a plurality of speed ratios between an input shaft and an output shaft, comprising:

a plurality of planetary-gear stages including an upstream stage, a downstream stage and a further stage beyond said downstream stage, each of said stages consisting of three components constituted by a sun gear, a ring gear and a planet carrier having at least one pinion in mesh with said sun and ring gears;

a plurality of coaxial intermediate shafts, one of said intermediate shafts being rigid with the sun gears of said upstream, downstream and further stages, another of said intermediate shafts being rigid with a component of said upstream stage other than the sun gear thereof, said upstream stage having its planet carrier fixedly connected with the ring gear of said downstream stage, said downstream stage having its planet carrier fixedly connected with a component of said further stage other than the sun gear thereof, the planet carrier of said further stage being rigid with said output shaft;

a plurality of clutches selectively actuatable to connect any one of said intermediate shafts with said input shaft; and a plurality of brakes selectively actuatable to immobilize any one of said intermediate shafts whereby a plurality of forward speed ratios and at least one reverse speed ratio are establishable by the joint actuation of a selected clutch and a selected brake.

6. A transmission as defined in claim 5 wherein the ring gear and the planet carrier of said upstream stage are each rigid with a respective one of said intermediate shafts.

7. A transmission as defined in claim 5 wherein said further stage is demountable and the planet carrier of said downstrem stage is directly connectable with said output shaft, with resulting reduction in the number of said speed ratios.

8. A transmission providing a plurality of speed ratios between an input shaft and an output shaft, comprising:

a first, a second, a third and a fourth planetary-gear stage each consisting of a driving component, a driven component and a control component coaxially engaging one another, one of said components being a sun gear, another of said components being a ring gear, the remaining component being a planet carrier having at least one pinion in mesh with said sun and ring gears, said first stage having its driven component operatively linked with said output shaft, said second stage having its driven component rigid with one of the components of said first stage other than the driving component thereof, said third stage having its driven component rigid with the control component of said second stage, said fourth stage having its driven and control components cross-connected with the control and driven components of said third stage;

a plurality of coaxial intermediate shafts including one intermediate shaft rigid with the driving components of said first, second and third stages and another intermediate shaft rigid with the driving component of said fourth stage;

a plurality of clutches selectively actuatable to connect any of said intermediate shafts with said input shaft; and a first, a second and a third brake selectively actuatable to immobilize the control components of said first, second and third stages, respectively, whereby a plurality of forward speed ratios and a plurality of reverse speed ratios are establishable by the joint actuation of a selected clutch and a selected brake.

9. A transmission as defined in claim 8, further comprising a fourth brake selectively actuatable to immobilize the driving component of said fourth stage.

10. A transmission as defined in claim 8 wherein said intermediate shafts include a further shaft rigid with the control component of said fourth stage.

11. A transmission as defined in claim 8 wherein said intermediate shafts include a further shaft rigid with the driven component of said fourth stage.

12. A transmission as defined in claim 8 wherein said intermediate shafts include two further shafts rigid with the driven component and the control component, respectively, of said fourth stage.

13. A transmission as defined in claim 12 wherein said brakes include a fourth brake selectively actuatable to immobilize the driving component of said fourth stage.

14. A transmission as defined in claim 13 wherein certain of said stages, clutches and brakes are demountable, with resulting reduction in the number of said speed ratios.

15. A transmission as defined in claim 8 wherein said driving components are the sun gears and said driven components are the planet carriers of said stages.

* * * * *